(12) United States Patent
Takeyama et al.

(10) Patent No.: US 8,379,299 B2
(45) Date of Patent: Feb. 19, 2013

(54) OPTICAL AMPLIFIER

(75) Inventors: Tomoaki Takeyama, Kawasaki (JP); Keiko Sasaki, Kawasaki (JP); Shinichirou Muro, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 453 days.

(21) Appl. No.: 12/692,591

(22) Filed: Jan. 23, 2010

(65) Prior Publication Data

US 2010/0245988 A1 Sep. 30, 2010

(30) Foreign Application Priority Data

Mar. 26, 2009 (JP) ................................ 2009-077154

(51) Int. Cl.
*H04B 10/17* (2006.01)
*H04B 10/12* (2006.01)

(52) U.S. Cl. ............. 359/341.33; 359/341.32; 359/337.4

(58) Field of Classification Search ............. 359/341.32, 359/341.33, 337.4
See application file for complete search history.

(56) References Cited

U.S. PATENT DOCUMENTS

| | | | | |
|---|---|---|---|---|
| 5,140,456 A * | 8/1992 | Huber | | 359/341.33 |
| 5,745,283 A * | 4/1998 | Inagaki et al. | | 359/337.13 |
| 7,085,043 B2 * | 8/2006 | Takeyama et al. | | 359/337.1 |
| 7,330,303 B2 * | 2/2008 | Sato et al. | | 359/341.41 |
| 7,400,441 B2 * | 7/2008 | Muro et al. | | 359/334 |
| 2001/0008459 A1 * | 7/2001 | Ohshima et al. | | 359/341.44 |
| 2002/0008901 A1 * | 1/2002 | Kinoshita | | 359/341.1 |
| 2003/0099475 A1 | 5/2003 | Nemoto et al. | | |
| 2004/0212875 A1 * | 10/2004 | Li et al. | | 359/337.4 |
| 2005/0078358 A1 * | 4/2005 | Sato et al. | | 359/337.4 |
| 2010/0245986 A1 * | 9/2010 | Qiao | | 359/337 |
| 2010/0322627 A1 * | 12/2010 | Desbruslais et al. | | 398/65 |

FOREIGN PATENT DOCUMENTS

| | | |
|---|---|---|
| JP | 2003-163641 A | 6/2003 |
| JP | 2005-116884 A | 4/2005 |

OTHER PUBLICATIONS

Bakshi et al. "Impact of Polarization Hole Burning in Lightly Loaded Ultra Long-Haul WDM Systems", Optical Fiber Communication and National Fiber Optic Engineers Coneference, 2007, pp. 1-3 (2007).*

* cited by examiner

*Primary Examiner* — Eric Bolda
(74) *Attorney, Agent, or Firm* — Fujitsu Patent Center

(57) ABSTRACT

An optical amplifier includes a first excitation light source that outputs a first excitation light; a second excitation light source that outputs a second excitation light; a first amplifying optical fiber doped with a rare-earth element and excited by the first excitation light to amplify light input to the first amplifying optical fiber; and a second amplifying optical fiber doped with a rare-earth element and excited by the second excitation light to amplify the light from the first amplifying optical fiber. A ratio between the intensity of the first excitation light and the intensity of the second excitation light is controlled according to the number of signal lights wavelength-multiplexed in the light input.

9 Claims, 15 Drawing Sheets

OPTICAL AMPLIFIER

CROSS REFERENCE TO RELATED APPLICATIONS

This application is based upon and claims the benefit of priority of the prior Japanese Patent Application No. 2009-077154, filed on Mar. 26, 2009, the entire contents of which are incorporated herein by reference.

FIELD

The embodiments discussed herein are related to an optical amplifier that amplifies signal light.

BACKGROUND

Accompanying the development of multimedia networks, communication traffic demands are dramatically increasing. In communication systems of today's multimedia society, erbium doped fiber amplifiers (EDFA) using EDF an amplifying medium and wavelength division multiplexing (WDM) transmission systems performing wavelength multiplexing of signal light play an important role.

In WDM transmission systems, for example, arrayed waveguide grating (AWG) transmits wavelength-multiplexed signal light and an EDFA along the transmission path amplifies the signal light. In addition to signal components, the signal light amplified by EDFA includes amplified spontaneous emission (ASE) generated across the entire band by the EDFA.

On the other hand, recently, WDM transmission systems are being actively introduced in urban metro core networks attaching importance on cost and size. Accordingly, optical add drop multiplexers (OADM) are being increasingly introduced. OADMs perform wavelength demultiplexing with respect to received WDM signal light using AMG to add, transmit, or drop resulting demultiplexed signal lights.

Signal lights added or transmitted are subjected to the power adjustment by a variable optical attenuator (VOA) and are wavelength-multiplexed by AWG. The wavelength-multiplexed (WDM) signal light is amplified by an EDFA and then sent to a transmission path. In the WDM transmission system, the number of signal lights wavelength-multiplexed in the signal light to be transmitted (hereinafter, simply "wavelength count") varies as needed (e.g., 1 to 40).

When the wavelength count of the WDM signal light is small, ASE alone is transmitted by a channel that does not include a signal component. However, since the deterioration of S/ASE ratio increases after the multi-span transmission, it is difficult to determine whether a signal component is included in the respective channels. In this regard, a technique of constraining ASE by maximizing an attenuation amount of a VOA corresponding to a channel that does not include the signal component has been disclosed (see, e.g., Japanese Laid-Open Patent Publication No. 2003-163641).

In such OADMs, the wavelength count frequently changes due to the adding and the dropping of signal components. Therefore, it is preferable for the characteristics of the EDFA to be such that the excitation light power may be controlled quickly to achieve a constant gain even when the wavelength count changes. This is implemented by a known EDFA configuration that includes two EDFs sandwiching a gain equalizer (GEQ) (see, e.g., Japanese Laid-Open Patent Publication No. 2005-116884).

By calculating the current gain error from monitor values of input/output powers to control the excitation light power of LD (Laser Diode) such that the gain error is reduced, this configuration performs control of constant gain quickly in response to changes in the wavelength count. The configuration further performs constant gain control while maintaining the ratio of the upstream EDF excitation power to the downstream EDF excitation power (excitation ratio).

However, in the above conventional technology, when the wavelength count is small, the polarized state of the signal light is not averaged, resulting in a problem of increased polarization of the signal light. If the degree of polarization of the signal light increases, polarization hole burning (PHB) generated in the EDF increases, deteriorating the quality of the signal light (e.g., optical signal noise ratio (OSNR)).

In particular, when ASE (not polarized) is constrained by VOA control as in the technology disclosed in Japanese Laid-Open Patent Publication No. 2003-163641, the degree of polarization of the signal light increases more since the polarized state of the signal light of each channel is not averaged. When the wavelength count of the signal light is large, the degree of polarization of the signal light decreases since the polarized state of the signal light of each channel is averaged.

PHB is a phenomenon of a gain reduction in polarized light parallel to signal light when high power signal light is input to an EDF. The gain of the signal light and the gain of polarized ASE parallel to the signal light are reduced. On the other hand, since polarized ASE orthogonal to the signal is not affected by PHB, the gain is not reduced. Therefore, the polarized ASE orthogonal to the signal increases and OSNR of the signal light deteriorates.

SUMMARY

According to an aspect of an embodiment, an optical amplifier includes a first excitation light source that outputs a first excitation light; a second excitation light source that outputs a second excitation light; a first amplifying optical fiber doped with a rare-earth element and excited by the first excitation light to amplify light input to the first amplifying optical fiber; and a second amplifying optical fiber doped with a rare-earth element and excited by the second excitation light to amplify the light from the first amplifying optical fiber. The ratio between the intensity of the first excitation light and the intensity of the second excitation light is controlled according to the number of signal lights wavelength-multiplexed in the light input.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to the accompanying drawings.

Figure 1:
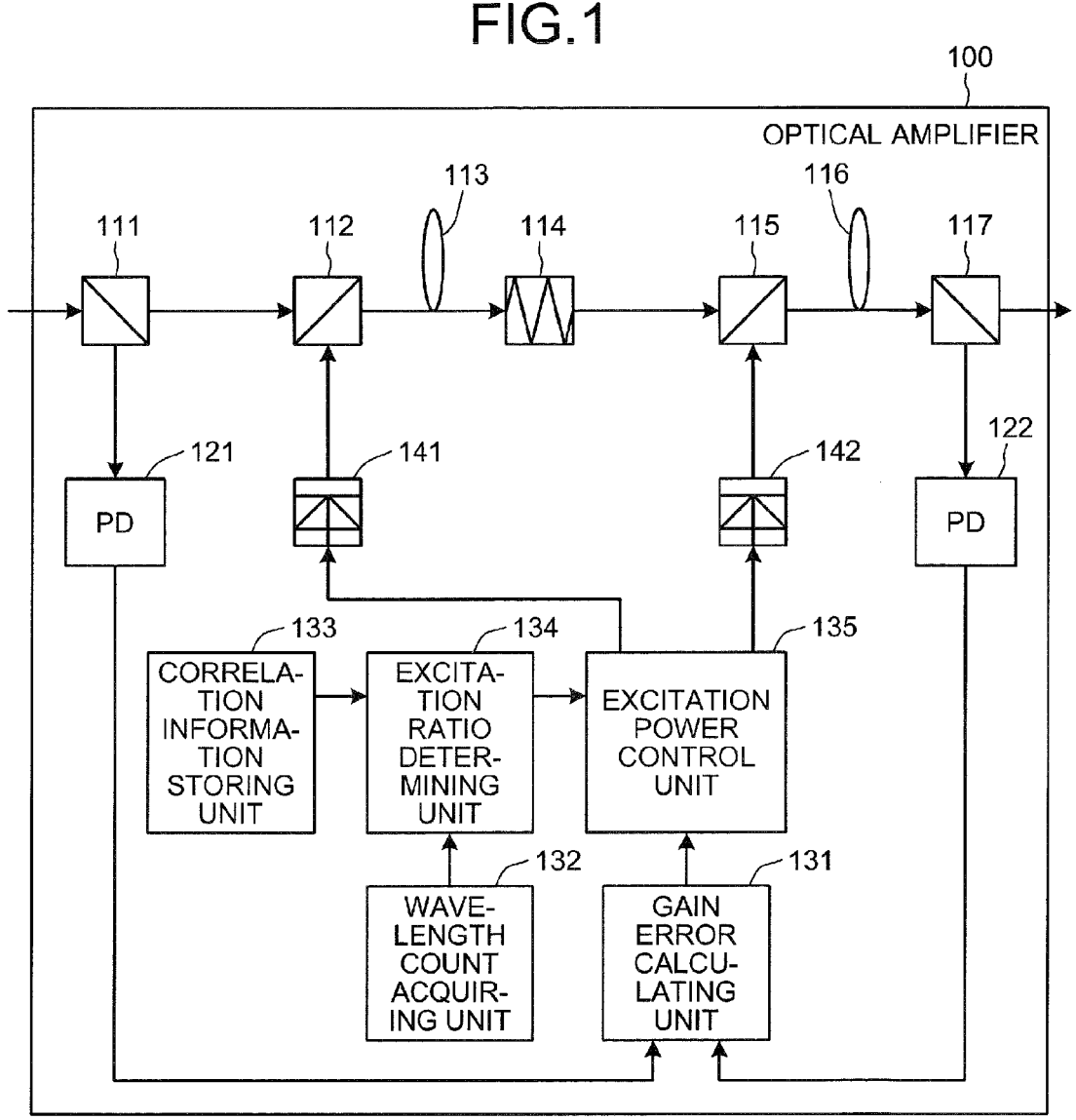
FIG. 1 is a block diagram of an optical amplifier according to a first embodiment.

FIG. 1 is a block diagram of an optical amplifier according to a first embodiment. As depicted in FIG. 1, an optical amplifier 100 according to the first embodiment includes an optical branching unit 111, an optical coupling unit 112, an EDF 113, a GEQ 114, an optical coupling unit 115, an EDF 116, an optical branching unit 117, a photo detector 121 (PD), a PD 122, a gain error calculating unit 131, a wavelength count acquiring unit 132, a correlation information storage unit 133, an excitation ratio determining unit 134, an excitation power control unit 135, a first LD 141, and a second LD 142.

Signal light from upstream of the optical amplifier 100 is input to the optical branching unit 111. The optical branching unit 111 branches the input signal light and outputs the respective branches of the signal light to the optical coupling unit 112 and the PD 121. The optical coupling unit 112 couples the light from the optical branching unit 111 and from the first LD 141 and outputs the couple light to the EDF 113. For example, the optical coupling unit 112 outputs the signal light from the optical branching unit 111 to the EDF 113. The optical coupling unit 112 further outputs the excitation light output from the first LD 141 to the EDF 113.

The EDF 113 is a first amplifying optical fiber doped with a rare-earth element and excited by the excitation light output from the first LD 141 to amplify light input thereto. For example, the EDF 113 transmits the signal light and the excitation light from the optical coupling unit 112, to the GEQ 114. The signal light transmitted through the EDF 113 is amplified according to the power of the excitation light transmitted through the EDF 113 concurrently with the signal light. The GEQ 114 attenuates the power of the signal light output from the EDF 113 by a predetermined amount to equalize gains in the channels of the signal light. The GEQ 114 outputs the power attenuated signal light to the optical coupling unit 115.

The optical coupling unit 115 couples the light from the GEQ 114 and from the second LD 142 and outputs the coupled light to the EDF 116. For example, the optical coupling unit 115 outputs the signal light from the GEQ 114, to the EDF 116. The optical coupling unit 115 further outputs the excitation light output from the second LD 142, to the EDF 116.

The EDF 116 is a second amplifying optical fiber doped with a rare-earth element and excited by the excitation light output from the second LD 142 to amplify light output from the EDF 113. For example, the EDF 116 transmits the signal light and the excitation light from the optical coupling unit 115, to the branching unit 117. The signal light transmitted through the EDF 116 is amplified according to the power of the excitation light transmitted through the EDF 116 concurrently with the signal light. The branching unit 117 branches the signal light from the EDF 116 and outputs the respective branches of the signal light to an optical amplifier 100 downstream and the PD 122.

The PD 121 receives the signal light output from the optical branching unit 111 and outputs, to the gain error calculating unit 131, an input power signal indicative of the power of the received signal light. The input power signal output from the PD 121 indicates the power of the signal light input to the optical amplifier 100. The PD 122 receives the signal light output from the optical branching unit 117 and outputs, to the gain error calculating unit 131, an output power signal indicative of the power of the received signal light. The output power signal output from the PD 122 indicates the power of the signal light output from the optical amplifier 100.

The gain error calculating unit 131 obtains a difference between the input power signal output from the PD 121 and the output power signal output from the PD 122 to calculate the gain of the signal light due to the optical amplifier 100. The gain error calculating unit 131 obtains a difference between the calculated gain and a preset target gain to calculate a gain error. The gain error calculating unit 131 notifies the excitation power control unit 135 of the calculated gain error.

The wavelength count acquiring unit 132 acquires the wavelength count of the signal light input to the optical amplifier 100. For example, the wavelength count acquiring unit 132 acquires the wavelength count through a control channel from a communication apparatus (e.g., OADM 1810 depicted in FIG. 18) upstream from the optical amplifier 100. The wavelength count acquiring unit 132 may acquire the wavelength count by acquiring the input power signal output from the PD 121 and calculating the wavelength count based on the acquired input power signal.

For example, since the wavelength count and the input power of the optical amplifier 100 are in a proportional relation, the wavelength count acquiring unit 132 calculates the wavelength count by dividing the input power indicated by the input power signal by power per wavelength. The wavelength count acquiring unit 132 notifies the excitation ratio determining unit 134 of the acquired wavelength count.

The correlation information storage unit 133 is memory that stores correlation information correlating the wavelength count with an excitation ratio. The correlation information is, for example, a function that derives an excitation ratio from the wavelength count. Alternatively, the correlation information may be a table correlating the wavelength count with an excitation ratio. The correlation information is determined by, for example, experiments in advance and stored in the correlation information storage unit 133.

The excitation ratio determining unit 134 reads the correlation information from the correlation information storage unit 133. The excitation ratio determining unit 134 calculates an excitation ratio based on the read correlation information and the wavelength count supplied from the wavelength count acquiring unit 132. The excitation ratio determining unit 134 notifies the excitation power control unit 135 of the calculated excitation ratio.

The excitation power control unit 135 determines a total power of the excitation light of the first LD 141 and of the second LD 142 such that the gain error reported by the gain error calculating unit 131 is reduced (constant gain control). The excitation power control unit 135 determines the respective powers of the excitation light of the first LD 141 and of the second LD 142 based on the determined total power and the excitation ratio received from the excitation ratio determining unit 134.

The excitation power control unit 135 transmits to the first LD 141, a drive signal indicative of the determined excitation light power of the first LD 141 and transmits to the second LD 142, a drive signal indicative of the determined excitation light power of the second LD 142. The gain error calculating unit 131, the wavelength count acquiring unit 132, the excitation ratio determining unit 134, and the excitation power control unit 135 are implemented by a calculating device such as central processing unit (CPU).

The first LD 141 is a first excitation light source that generates excitation light (first excitation light) having a power corresponding to the drive signal output from the excitation power control unit 135 and outputs the generated excitation light to the optical coupling unit 112. The second LD 142 is a second excitation light source that generates excitation light (second excitation light) having a power corresponding to the drive signal output from the excitation power control unit 135 and outputs the generated excitation light to the optical coupling unit 115. The wavelengths of the excitation light generated by the first LD 141 and the second LD 142 are 0.98 [μm] or 1.48 [μm], for example.

With the above configuration, the ratio between the intensity of the excitation light (the first excitation light) output from the first LD 141 and the intensity of the excitation light (the second excitation light) output from the second LD 142 is controlled according to the number (wavelength count) of signal lights wavelength-multiplexed in the signal light input to the optical amplifier 100. For example, the ratio of the intensity of the excitation light (the first excitation light) output from the first LD 141 to the intensity of the excitation light (the second excitation light) output from the second LD 142 increases as the number (wavelength count) of signal lights wavelength-multiplexed in the input light of the optical amplifier 100 increases.

Figure 2:
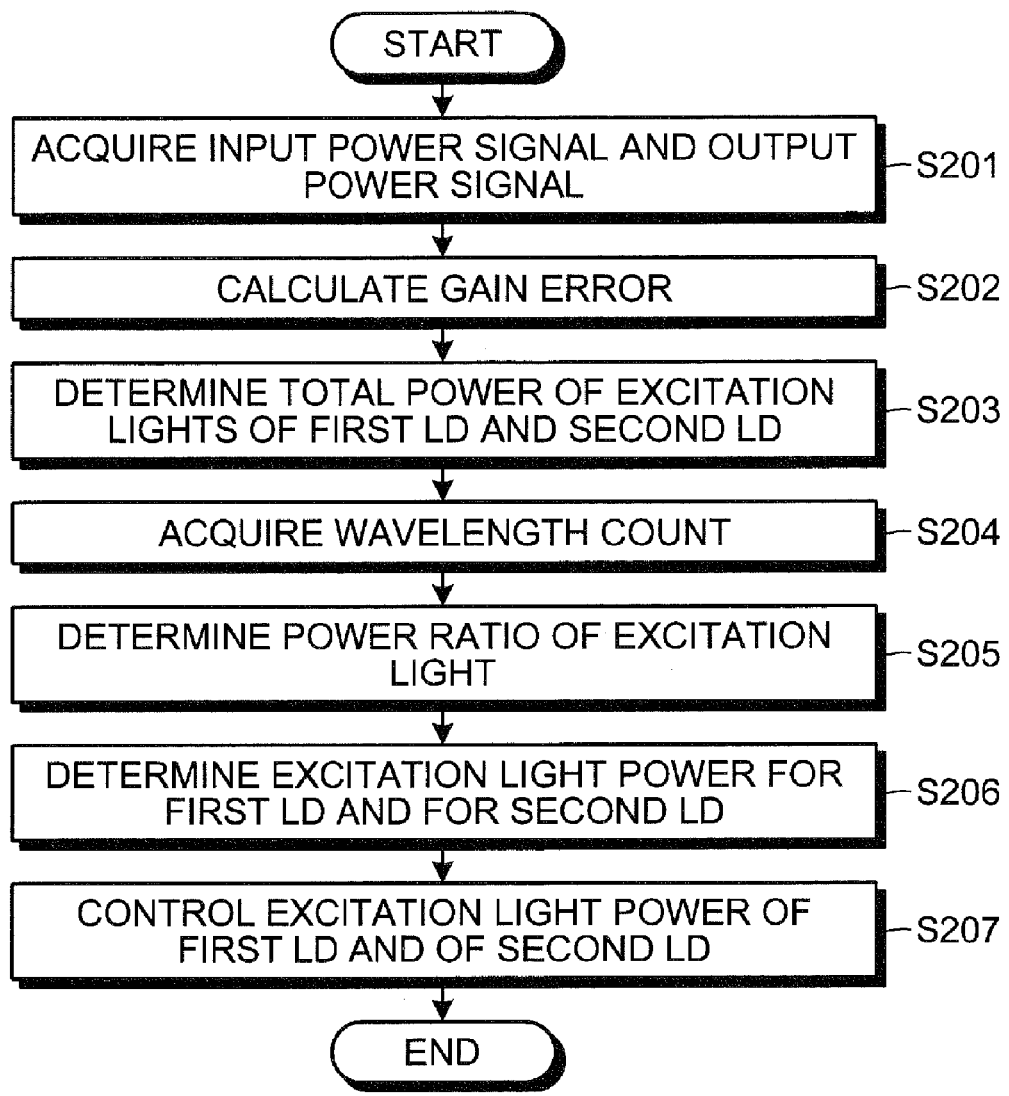
FIG. 2 is a flowchart of an example of the operation of the optical amplifier depicted in FIG. 1.

FIG. 2 is a flowchart of an example of the operation of the optical amplifier depicted in FIG. 1. The gain error calculating unit 131 acquires the input power signal output from the PD 121 and the output power signal output from the PD 122 (step S201). The gain error calculating unit 131 calculates the gain error based on the input power signal and the output power signal acquired at step S201 (step S202).

The excitation power control unit 135 then determines a total power of the excitation light of the first LD 141 and of the second LD 142 such that the gain error calculated at step S202 is reduced (step S203). The wavelength count acquiring unit 132 acquires the wavelength count of the signal light input to the optical amplifier 100 (step S204).

The excitation ratio determining unit 134 determines the power ratio of the excitation light of the first LD 141 to that of the second LD 142 based on the wavelength count acquired at step S204 (step S205). The excitation power control unit 135 determines the excitation light power for the first LD 141 and for the second LD 142 from the total power determined at step S203 and the power rate determined at step S205 (step S206).

The excitation power control unit 135 controls the excitation light power of the first LD 141 and of the second LD 142 (step S207), thereby ending a series of the operations. At step S207, the excitation power control unit 135 outputs, to the first LD 141 and the second LD 142, drive signals corresponding to the excitation light powers determined at step S206. Repeated execution of the above operations enables the gain to be controlled at a constant level even when the wavelength count of the signal light changes and further enables the excitation ratio to be controlled according to the wavelength count of the signal light.

Figure 3:
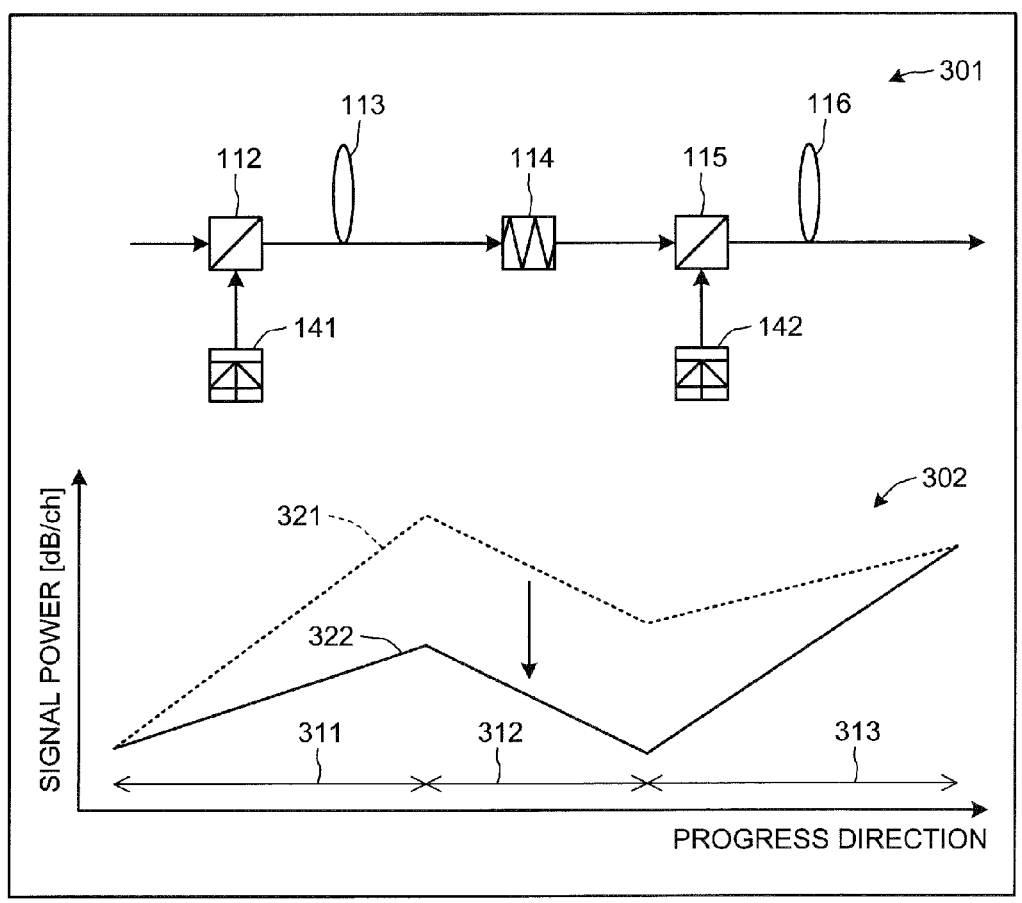
FIG. 3 is a schematic depicting changes in signal power in response to the control of the excitation ratio.

FIG. 3 is a schematic depicting changes in signal power in response to the control of the excitation ratio. In FIG. 3, a portion of the optical amplifier 100 depicted in FIG. 1 is depicted and indicated by reference numeral 301. Reference number 302 represents a graph depicting changes in the signal power [dB/ch] of the signal light passing through the optical amplifier 100. In the graph 302, the horizontal axis indicates the progress direction corresponding to the portion of the optical amplifier 100 depicted and indicated by reference numeral 301.

A section 311 along the progress direction is a section of the signal light passing through the EDF 113. A section 312 along the progress direction is a section of the signal light passing through the GEQ 114. A section 313 along the progress direction is a section of the signal light passing through the EDF 116. A power change 321 indicates changes in the power of the signal light passing through the optical amplifier 100 when the wavelength count of the signal light is large (e.g., 40 wavelengths). A power change 322 indicates changes in the power of the signal light passing through the optical amplifier 100 when the wavelength count is smaller than in the case of the power change 321 (e.g., 10 wavelengths).

As indicated by the power change 321 and the power change 322, signal light passing through the optical amplifier 100 is amplified by the EDF 113 in the section 311, attenuated by the GEQ 114 in the section 312, and amplified by the EDF 116 in the section 313. In either case of the power change 321 and the power change 322, the excitation power control unit 135 performs control such that the gain is kept constant at the time of output from the optical amplifier 100.

As described, the excitation power control unit 135 lowers the ratio (excitation ratio) of the excitation light power of the first LD 141 to the excitation light power of the second LD 142 when the wavelength count of the signal light decreases. For example, when the wavelength count of the signal light changes from 40 wavelengths to 10 wavelengths, the power change 321 changes to the power change 322.

In the case of the power change 322, the power of the signal light passing through the EDF 113 and the EDF 116 is lower than the case of the power change 321. On the other hand, PHB has a property in that the occurrence of PHB becomes more pronounced when the power of the signal light passing through the EDF is greater. Therefore, in the case of the power change 322, the occurrence of PHB may be constrained as compared to the case of the power change 321.

However, when the power of the signal light passing through the EDF 113 and the EDF 116 becomes too low, noise figure (NF) generated in the EDF 113 and the EDF 116 increases. Therefore, the OSNR deterioration of the signal light due to NF becomes pronounced. If the wavelength count of the signal light is large, the effect of PHB is reduced since the polarization degree of the signal light drops.

Therefore, the excitation power control unit 135 lowers the excitation ratio to constrain the increase in PHB when the wavelength count of the signal light is small and increases the excitation ratio to constrain the increase in NF when the wavelength count of the signal light is large. This enables the quality of the signal light to be improved when the wavelength count of the signal light is small while maintaining the quality of the signal light when the wavelength count of the signal light is large.

Figure 4:
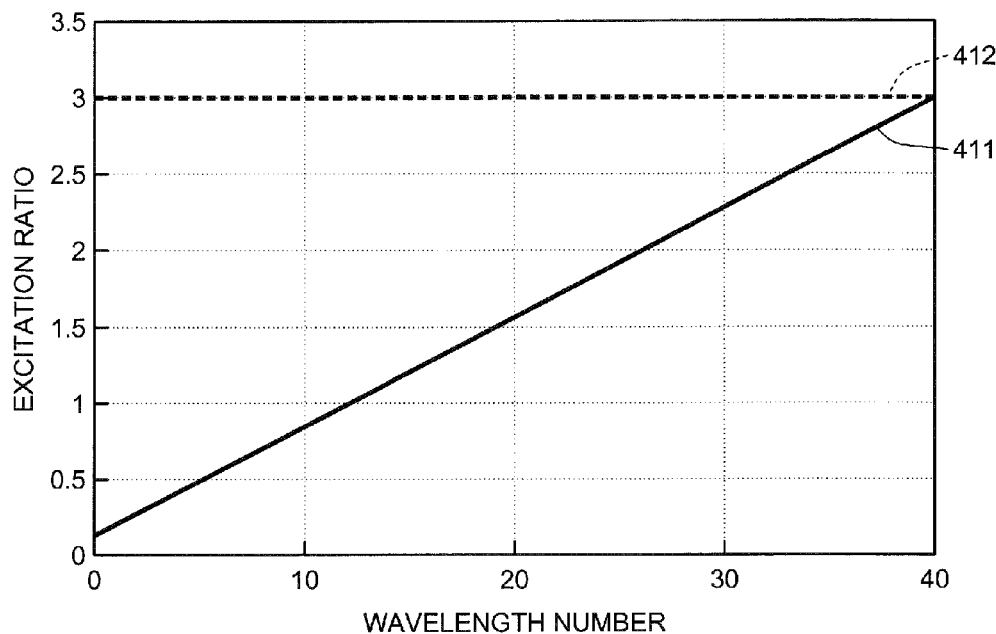
FIG. 4 is a graph of an example of correlation information correlating wavelength count and excitation ratio.

FIG. 4 is a graph of an example of the correlation information correlating the wavelength count and the excitation ratio. In FIG. 4, the horizontal axis indicates the wavelength count of the signal light. The vertical axis indicates a ratio (an excitation ratio) of the excitation light power of the first LD 141 to the excitation light power of the second LD 142. The correlation information of the wavelength count and the excitation ratio is a linear function 411 of the excitation ratio to the wavelength count, for example.

The excitation ratio determining unit 134 determines the excitation ratio based on the linear function 411 and the wavelength count. The linear function 411 is an increasing function that raises the excitation ratio as the wavelength count increases. Therefore, the excitation ratio determining unit 134 lowers the excitation ratio as the wavelength count decreases. Since the power of the signal light passing through each EDF is reduced when the excitation ratio is lowered (see FIG. 3), the increase in PHB may be constrained when the wavelength count decreases. Therefore, the quality of the signal light may be improved by lowering the excitation ratio as the wavelength count decreases.

In the graph depicted in FIG. 4, a communication system satisfying the following conditions is assumed. The optical amplifier 100 is applied to an EDFA downstream from OADM (see, e.g., FIG. 18) and, in the OADM upstream from the EDFA, VOA control is performed to constrain ASE of channels that do not include a signal component. The maximum wavelength count is 40 wavelengths and the band used is a C-band.

The wavelengths of the excitation light of the first LD 141 and of the second LD 142 are 0.98 [μm] and 1.48 [μm], respectively. An interval of 100 [GHz] is assumed with a shortest wavelength of 1531.9 [μm] and a longest wavelength of 1563.0 [μm]; loss for each transmission path is 28 [dB]; the number of transmission spans is 23 nodes; the input to EDFA is −20 [dBm/ch] and the output therefrom is 3 [dBm/ch]. Identical conditions are assumed for the graphs depicted in FIGS. 6 to 9.

Reference numeral 412 indicates a relation between the wavelength count of the signal light and the excitation ratio of each excitation light in an example of a conventional optical amplifier as a reference. As indicated by reference numeral 412, in the example of the conventional optical amplifier, when the wavelength count changes, the excitation ratio of each excitation light is constant even if the total power of the excitation lights is changed.

Figure 5:
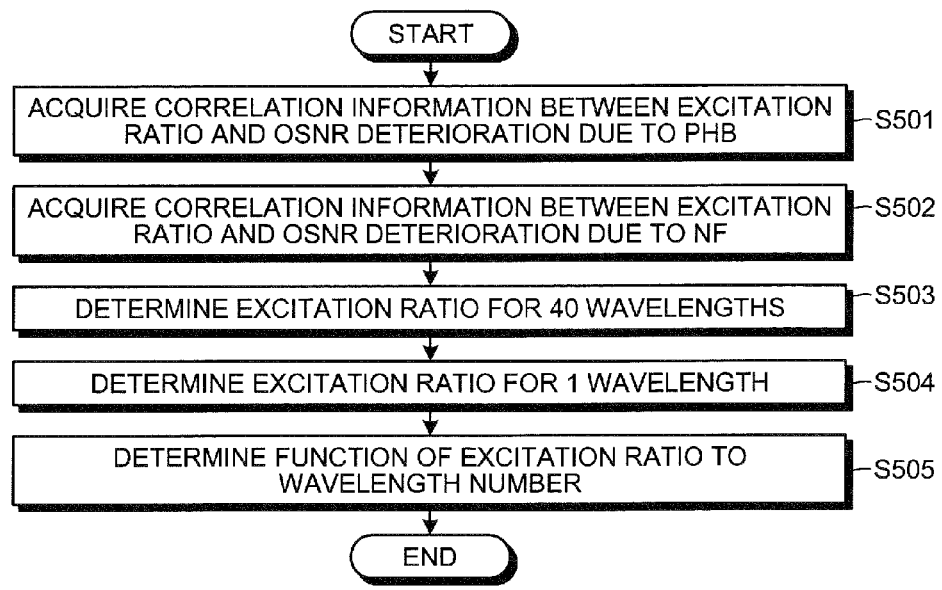
FIG. 5 is a flowchart of an example of a method of determining the correlation information depicted in FIG. 4.

FIG. 5 is a flowchart of an example of a method of determining the correlation information depicted in FIG. 4. Correlation information between the excitation ratio and the OSNR deterioration of the signal light due to PHB is acquired (step S501). Correlation information between the excitation ratio and the OSNR deterioration of the signal light due to NF is acquired (step S502). The excitation ratio for 40 wavelengths is determined based on the correlation information acquired at step S502 (step S503).

The excitation ratio for one wavelength is determined based on the correlation information acquired at steps S501 and S502 (step S504). A function of the excitation ratio to the wavelength count is determined based on the excitation ratios determined at steps S503 and S504 (step S505) and a series of the operations is terminated.

Figure 6:
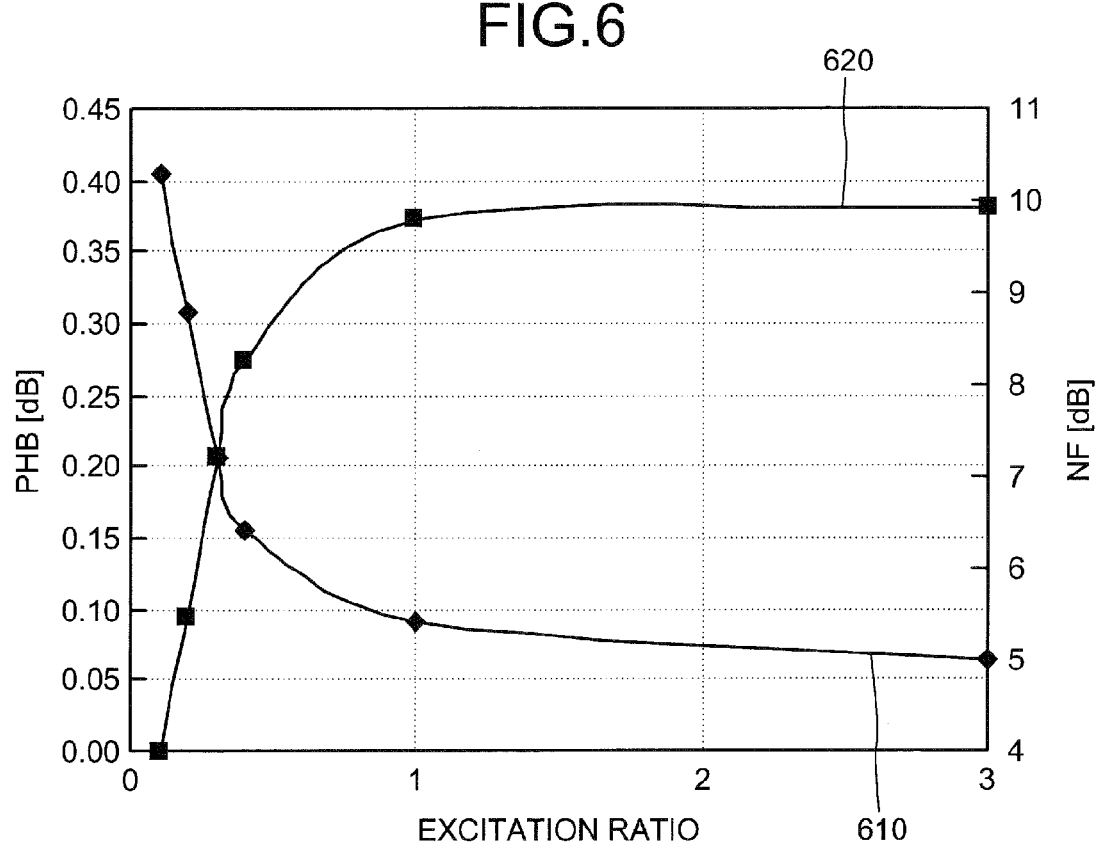
FIG. 6 is a graph of a relation between the excitation ratio and NF and PHB.

FIG. 6 is a graph of a relation between the excitation ratio and NF and PHB. In FIG. 6, the horizontal axis indicates the excitation ratio. The left vertical axis indicates PHB [dB] generated in the signal light in the EDFs 113 and 116. The right vertical axis indicates NF [dB] generated in the signal light in the EDFs 113 and 116.

Reference numeral 610 indicates a relation between the excitation ratio and NF of the signal light. As indicated by reference numeral 610, when the excitation ratio increases, NF of the signal light drastically drops in the section having an excitation ratio from zero to one. NF of the signal light gradually drops in the section having an excitation ratio from one to two. NF of the signal light drops more gradually in the section having an excitation ratio from two to three.

Reference numeral 620 indicates a relation between the excitation ratio and PHB of the signal light. As indicated by reference numeral 620, when the excitation ratio increases, NF of the signal light drastically increases in the section having an excitation ratio from zero to one. PHB of the signal light gradually increases in the section having an excitation ratio from one to two. PHB of the signal light increases more gradually in the section having an excitation ratio from two to three.

If the signal light has 40 wavelengths (large number of wavelengths), substantially no PHB is generated and the quality of the signal light may be improved by setting an excitation ratio causing sufficiently low NF. For example, at step S503 of FIG. 5, the excitation ratio determining unit 134 determines the excitation ratio of "3" causing sufficiently low NF based on the relation indicated by reference numeral 610 as the excitation ratio for 40 wavelengths.

Figure 7:
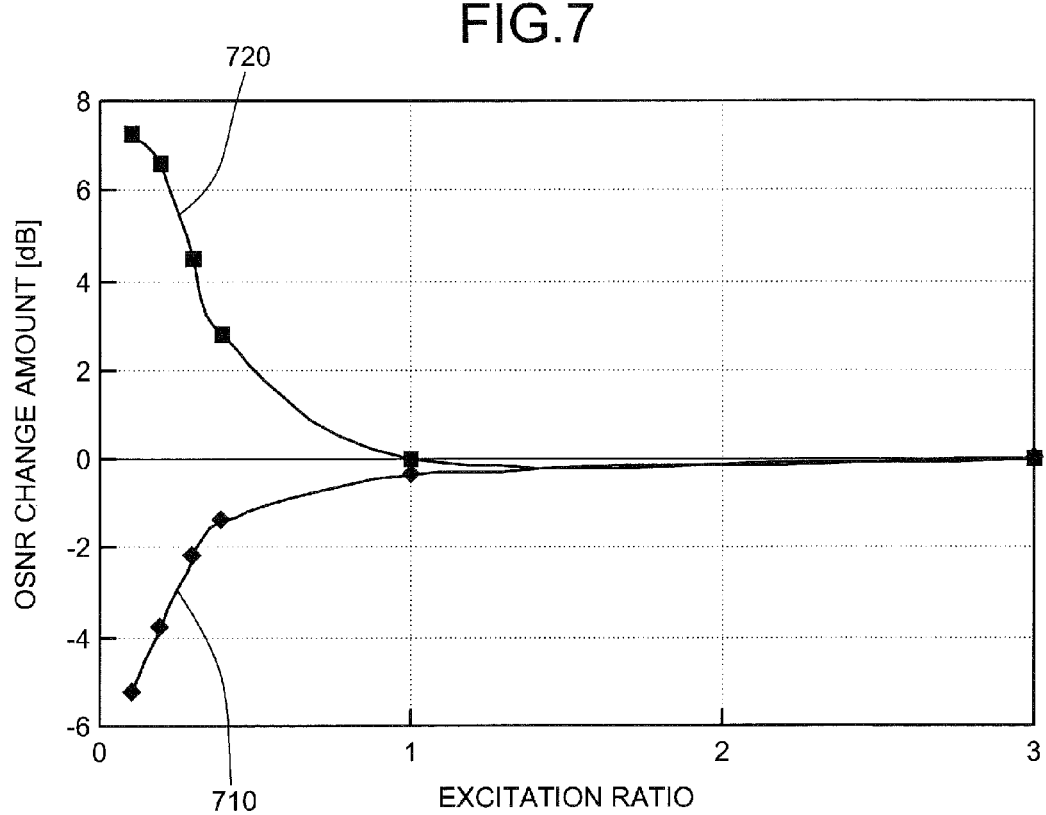
FIG. 7 is a graph of a relation between the excitation ratio and the OSNR change amount.

FIG. 7 is a graph of a relation between the excitation ratio and the OSNR change amount. In FIG. 7, the horizontal axis indicates the excitation ratio similarly as in FIG. 6. The vertical axis indicates the OSNR change amount [dB] of the signal light. The OSNR change amount represents the amount of change in OSNR due to changes in NF or PHB; the quality of the signal light is higher when the OSNR change amount is larger.

Reference numeral 710 indicates a relation between the excitation ratio and the OSNR change amount due to changes in NF (see FIG. 6). As indicated by reference numeral 710, when the excitation ratio increases, the OSNR change amount due to changes in NF drastically increases in the section having an excitation ratio from zero to one. The OSNR change amount due to changes in NF gradually increases in the section having an excitation ratio from one to three.

Reference numeral 720 indicates a relation between the excitation ratio and the OSNR change amount due to changes in PHB (see FIG. 6). As indicated by reference numeral 720, when the excitation ratio increases, the OSNR change amount due to changes in PHB drastically decreases in the section having an excitation ratio from zero to one. The OSNR change amount due to changes in PHB gradually decreases in the section having an excitation ratio from one to three.

As described, when the excitation ratio is increased, the OSNR change amount due to changes in NF increases (reference numeral 710) and the OSNR change amount due to changes in PHB decreases (reference numeral 720). If the signal has one wavelength (small number of wavelengths), since PHB generated is heavy and unignorable, the quality of the signal light may be improved by setting an excitation ratio that causes a higher total of the OSNR change amounts due to changes in NF and PHB.

Figure 8:
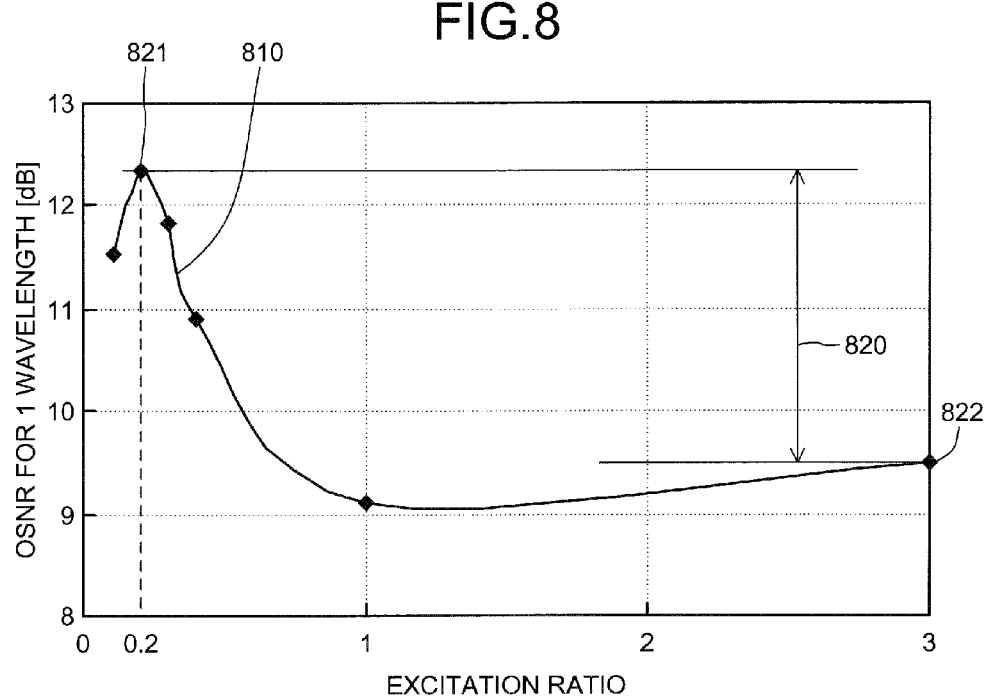
FIG. 8 is a graph of a relation between the excitation ratio and OSNR.

FIG. 8 is a graph of a relation between the excitation ratio and OSNR. In FIG. 8, the horizontal axis indicates the excitation ratio similarly as in FIG. 7. The vertical axis indicates OSNR [dB] of the signal light when the wavelength count of the signal light is one (at the time of one wavelength). Reference numeral 810 indicates a sum of the relation indicated by reference numeral 710 and the relation indicated by reference numeral 720 depicted in FIG. 7.

As indicated by reference numeral 810, when the wavelength count is one wavelength, OSNR increases in the section having an excitation ratio from 0 to 0.2. OSNR is highest when the excitation ratio is 0.2. OSNR drastically drops in the section having an excitation ratio from 0.2 to 1. OSNR gradually increases in the section having an excitation ratio from 1 to 3.

In this case, the excitation ratio determining unit 134 determines, for example, the excitation ratio of 0.2 causing the highest OSNR as the excitation ratio for one wavelength. On the other hand, for example, in the case of a conventional method of determining the excitation ratio such that NF is reduced without giving consideration to PHB when there are a small number of wavelengths, the excitation ratio when the wavelength count is one wavelength is determined as three as in the case of the excitation ratio when the wavelength count is 40 wavelengths. As denoted by reference numeral 820 of FIG. 8, when the wavelength count is one wavelength, it is known that OSNR 821 at the excitation ratio of 0.2 is improved by about 3 [dB] relative to OSNR 822 at the excitation ratio of 3.

The excitation ratio determining unit 134 determines the linear function depicted in FIG. 4 based on the determined excitation ratio of 3 for 40 wavelengths and the excitation ratio of 0.2 for 1 wavelength. For example, it is assumed that the linear function depicted in FIG. 4 is Y=aX+b (where Y is the excitation ratio and X is the wavelength count). The excitation ratio determining unit 134 calculates a and b based on Y=aX+b, X=40 and Y=3, and X=1 and Y=0.2 and determines the linear function depicted in FIG. 4.

Figure 9:
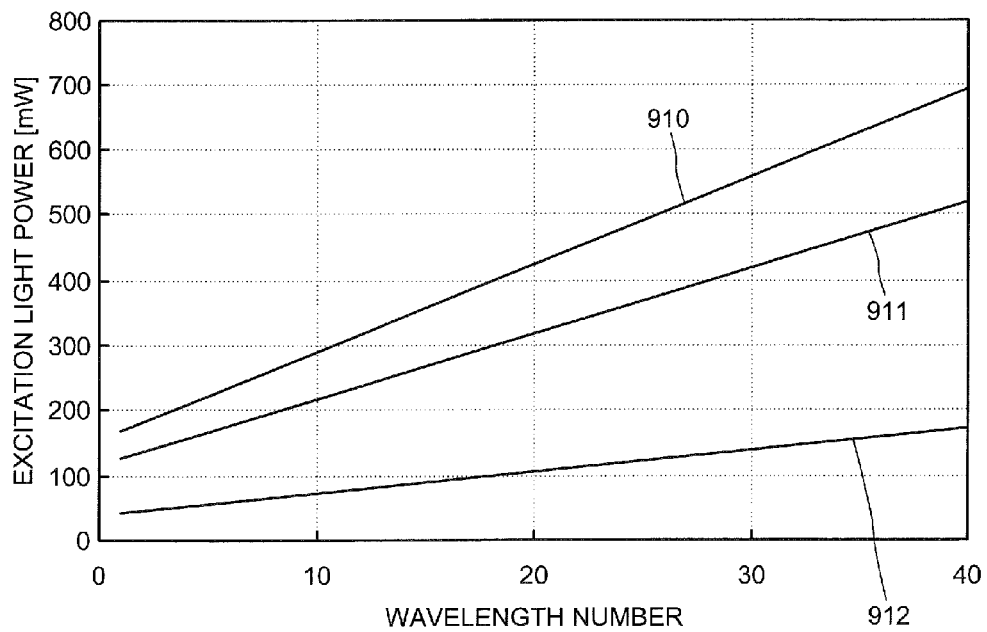
FIG. 9 is a graph of a relation between wavelength count and excitation light power.

FIG. 9 is a graph of a relation between the wavelength count and the excitation light powers. In FIG. 9, the horizontal axis indicates the wavelength count of the signal light input to the optical amplifier 100. The vertical axis indicates the power [mW] of the excitation lights output from the first LD 141 and the second LD 142. Reference numeral 910 indicates a relation between the wavelength count of the signal light and a total power of the excitation light of the first LD 141 and the second LD 142 controlled by the excitation power control unit 135.

Reference numeral 911 indicates a relation between the wavelength count of the signal light and the power of the excitation light of the first LD 141 controlled by the excitation power control unit 135. Reference numeral 912 indicates a relation between the wavelength count of the signal light and the power of the excitation light of the second LD 142 controlled by the excitation power control unit 135. Reference numeral 910 indicates a sum of the relation represented by reference numeral 911 and the relation represented by reference numeral 912.

As indicated by the relation represented by reference numeral 910, when the wavelength count of the signal light decreases, the excitation power control unit 135 performs control to keep the gain constant by reducing the total power of the excitation light of the first LD 141 and the second LD 142. As indicated by the relation represented by reference numeral 910, when the wavelength count of the signal light increases, the excitation power control unit 135 performs control to keep the gain constant by increasing the total power of the excitation light of the first LD 141 and the second LD 142.

On the other hand, as indicated by the relations represented by reference numerals 911 and 912, when the wavelength count of the signal light decreases, the excitation power control unit 135 prevents signal deterioration due to PHB by reducing the excitation ratios of the first LD 141 and the second LD 142. As indicated by the relations represented by reference numerals 911 and 912, when the wavelength count of the signal light increases, the excitation power control unit 135 prevents signal deterioration due to NF by increasing the excitation ratios of the first LD 141 and the second LD 142.

According to the optical amplifier 100 of the first embodiment, PHB is reduced in the case of a small wavelength count by acquiring the wavelength count of the signal light to change the ratio between the power of the first excitation light and the power of the second excitation light according to the wavelength count of the signal light. Thus, the quality of the signal light is improved. In particular, since PHB tends to occur when ASE of unused channels is constrained by a VOA, etc. of a communication apparatus upstream, the quality of the signal light is significantly be improved by reducing PHB via the optical amplifier 100.

Figure 10:
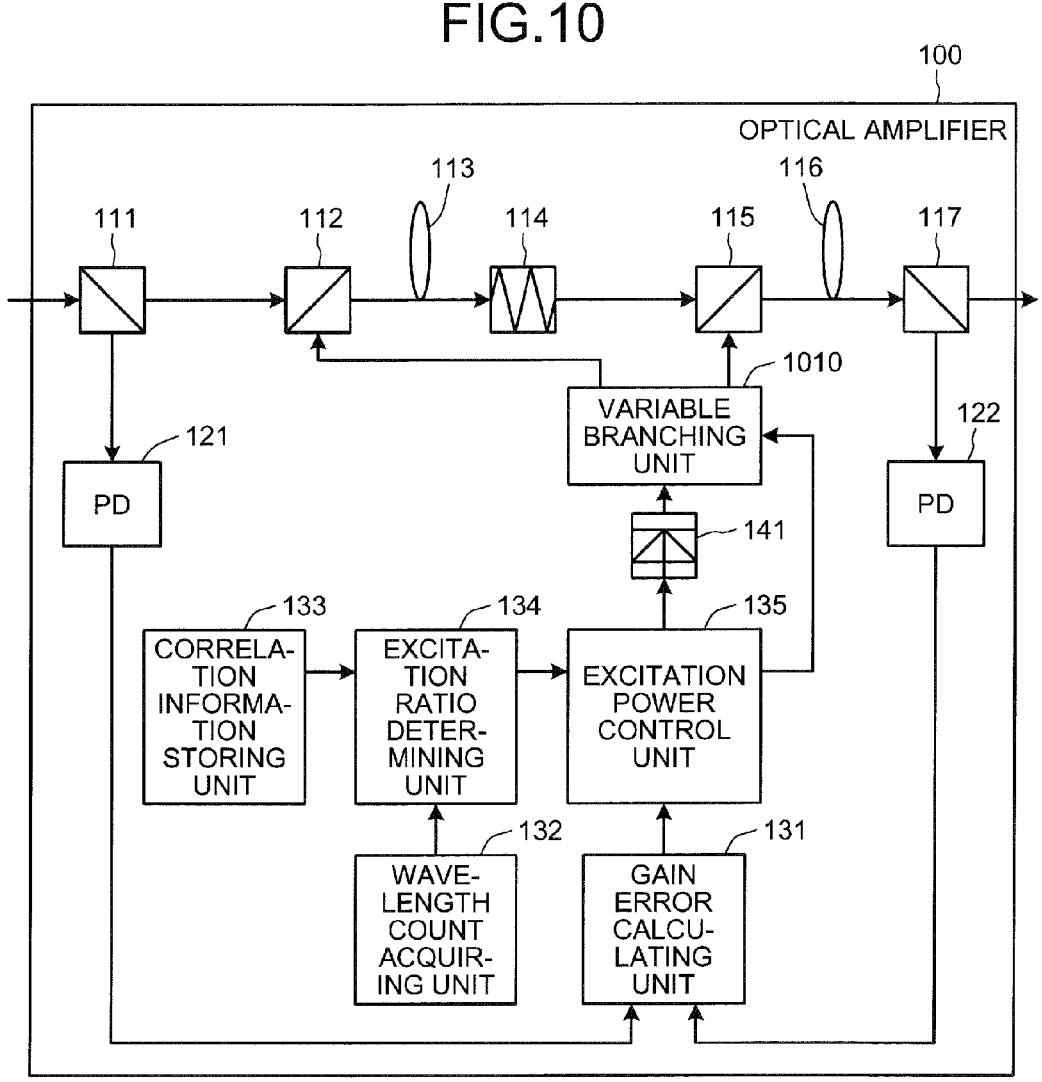
FIG. 10 is a block diagram of a configuration of an optical amplifier according to a second embodiment.

FIG. 10 is a block diagram of a configuration of an optical amplifier according to a second embodiment. In FIG. 10, constituent elements identical to those depicted in FIG. 1 are given the same reference numerals use din FIG. 1 and will not be described. As depicted in FIG. 10, the optical amplifier 100 according to the second embodiment includes a variable branching unit 1010 in addition to the configuration depicted in FIG. 1. The optical amplifier 100 according to the second embodiment may have a configuration omitting the second LD 142 depicted in FIG. 1.

The excitation power control unit 135 determines the excitation light power of the first LD 141 such that the gain error reported by the gain error calculating unit 131 is reduced and outputs a drive signal corresponding to the determined power to the first LD 141. The excitation power control unit 135 controls a branching rate of the variable branching unit 1010 to achieve the excitation ratio received from the excitation ratio determining unit 134. The first LD 141 generates an excitation light having a total power corresponding to the drive signal output from the excitation power control unit 135. The first LD 141 outputs the generated excitation light to the variable branching unit 1010.

The variable branching unit 1010 branches the excitation light output from the first LD 141 according to a variable branching rate. The variable branching unit 1010 changes the branching rate under the control of the excitation power control unit 135. The variable branching unit 1010 respectively outputs the branches of excitation light to the optical coupling unit 112 and the optical coupling unit 115. The optical coupling unit 112 outputs to the EDF 113, the excitation light (first excitation light) from the variable branching unit 1010. The optical coupling unit 115 outputs to the EDF 116, the excitation light (a second excitation light) from the variable branching unit 1010.

For example, it is assumed that the excitation ratio determining unit 134 notifies the excitation power control unit 135 of the excitation ratio of three. In this case, the excitation power control unit 135 performs control according to the branching rate of three determined by the excitation ratio determining unit 134. The variable branching unit 1010 branches the excitation light such that a power ratio of 3:1 is achieved between the excitation light output to the optical coupling unit 112 and the excitation light output to the optical coupling unit 115.

With the above configuration, the branching rate of the variable branching unit 1010 is controlled according to the number (wavelength count) of signal lights wavelength-multiplexed in the input light of the optical amplifier 100. For example, ratio of the intensity of the excitation light (the first excitation light) output to the EDF 113 to the intensity of the excitation light (the second excitation light) output to the EDF 116 increases as the number (wavelength count) of signal lights wavelength-multiplexed in the input light of the optical amplifier 100 increases.

Figure 11:
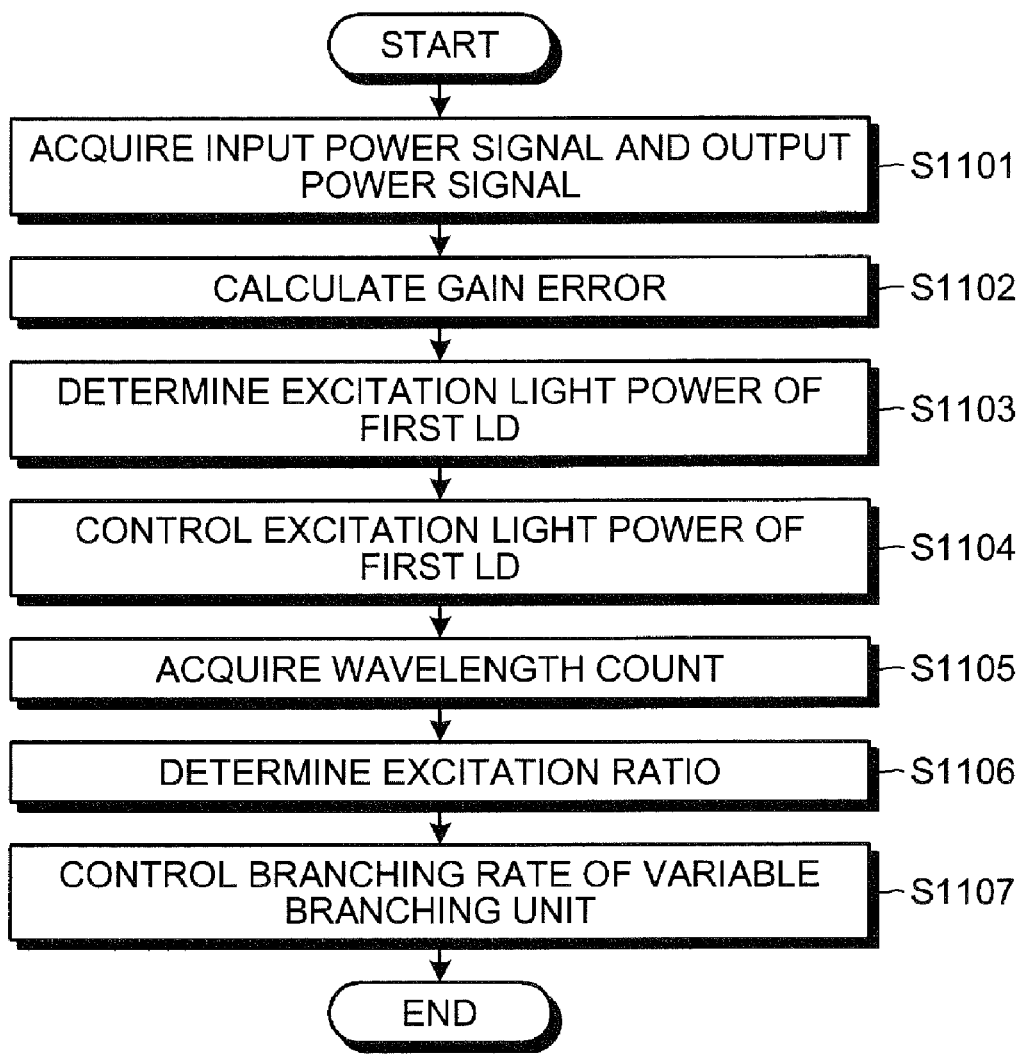
FIG. 11 is a flowchart of an example of the operation of the optical amplifier depicted in FIG. 10.

FIG. 11 is a flowchart of an example of the operation of the optical amplifier depicted in FIG. 10. The gain error calculating unit 131 acquires the input power signal output from the PD 121 and the output power signal output from the PD 122 (step S1101). The gain error calculating unit 131 calculates the gain error based on the input power signal and the output power signal acquired at step S1101 (step S1102).

The excitation power control unit 135 then determines the excitation light power of the first LD 141 such that the gain error calculated at step S1102 is reduced (step S1103). The excitation power control unit 135 outputs to the first LD 141, a drive signal corresponding to the power of the excitation light determined at step S1103, to control the excitation light power of the first LD 141 (step S1104).

The wavelength count acquiring unit 132 acquires the wavelength count of the signal light (step S1105). The excitation ratio determining unit 134 determines the excitation ratio based on the wavelength count acquired at step S1104 (step S1106). The excitation power control unit 135 controls the branching rate of the variable branching unit 1010 to achieve the excitation ratio determined at step S1103 (step S1107) and a series of operations is terminated.

Repeated execution of the above operations enables the gain to be controlled at a constant level even when the wavelength count of the signal light changes and further enables the excitation ratio to be controlled according to the wavelength count of the signal light. The change in the signal power due to the control of the excitation ratio in the second embodiment is identical to that in the first embodiment (see FIGS. 3 and 4) and will not be described. The method of determining the correlation information in the second embodiment is identical to that of the first embodiment (see FIGS. 5 to 8) and will not be described. The relation between the wavelength count and the powers of the excitation lights in the second embodiment identical to that in the first embodiment (see FIG. 9) and will not be described.

According to the optical amplifier 100 of the second embodiment, the ratio between the power of the first excitation light and the power of the second excitation light is controlled by acquiring the wavelength count of the signal light to change the branching rate of the variable branching unit 1010 according to the wavelength count of the signal light. Thus, an effect identical to that achieved by the optical amplifier 100 according to the first embodiment is achieved. Since a configuration without the second LD 142 (see FIG. 1) is possible, a lower cost of the apparatus is achieved.

Figure 12:
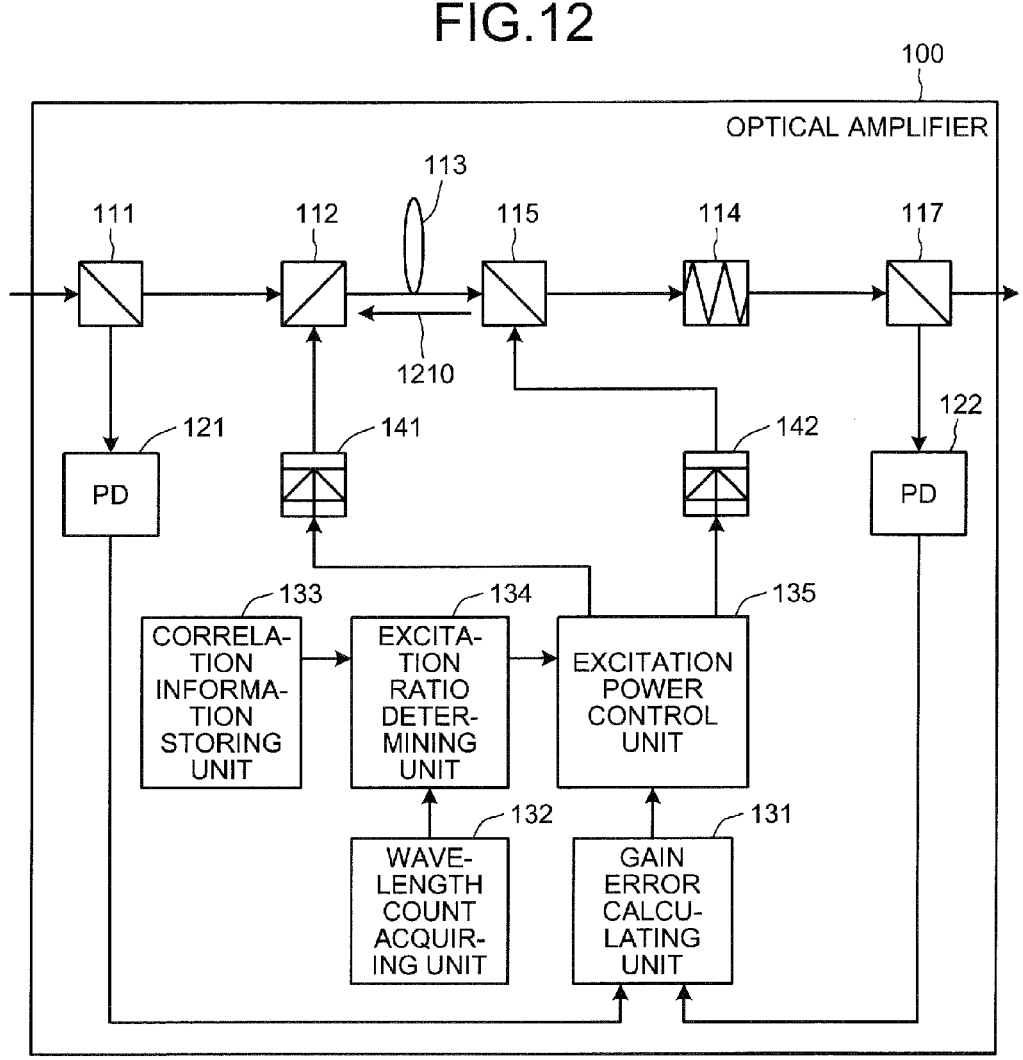
FIG. 12 is a block diagram of a configuration of an optical amplifier according to a third embodiment.

FIG. 12 is a block diagram of a configuration of an optical amplifier according to a third embodiment. In FIG. 12, constituent elements identical to those depicted in FIG. 1 are given the same reference numerals used in FIG. 1 and will not be described. As depicted in FIG. 12, the optical amplifier 100 according to the third embodiment may have a configuration omitting the EDF 116 depicted in FIG. 1.

The EDF 113 is an amplifying optical fiber doped with a rare-earth element and excited from the upstream side by the excitation light output from the first LD 141 as well as from the downstream side by the excitation light output from the second LD 142 to amplify signal light in the EDF 113. The EDF 113 transmits the signal light and the excitation light output from the optical coupling unit 112 and outputs the signal light and the excitation light to the optical coupling unit 115.

The optical coupling unit 115 outputs the excitation light from the EDF 113 to the GEQ 114 and outputs the excitation light from the second LD 142 to the EDF 113. As indicated by reference numeral 1210, the excitation light output from the optical coupling unit 115 to the EDF 113 passes through the EDF 113 in a direction opposite to the excitation light output from the optical coupling unit 112 to the EDF 113.

The GEQ 114 attenuates the power of the signal light output from the optical coupling unit 115 by a predetermined amount. The GEQ 114 outputs the signal light with the power attenuated to the optical branching unit 117. The optical branching unit 117 branches the signal light output from the GEQ 114. The optical branching unit 117 respectively outputs the branches of signal light to the PD 122 and a device downstream from the optical amplifier 100.

With the above configuration, that ratio between the intensity of the excitation light (the first excitation light) output from the first LD 141 and the intensity of the excitation light (the second excitation light) output from the second LD 142 is controlled according to the number (wavelength count) of signal lights wavelength-multiplexed in the input light of the optical amplifier 100. For example, the ratio of the intensity of the excitation light (the first excitation light) output from the first LD 141 to the intensity of the excitation light (the second excitation light) output from the second LD 142 increases as the number (wavelength count) of signal lights wavelength-multiplexed in the input light of the optical amplifier 100 increases.

Figure 13:
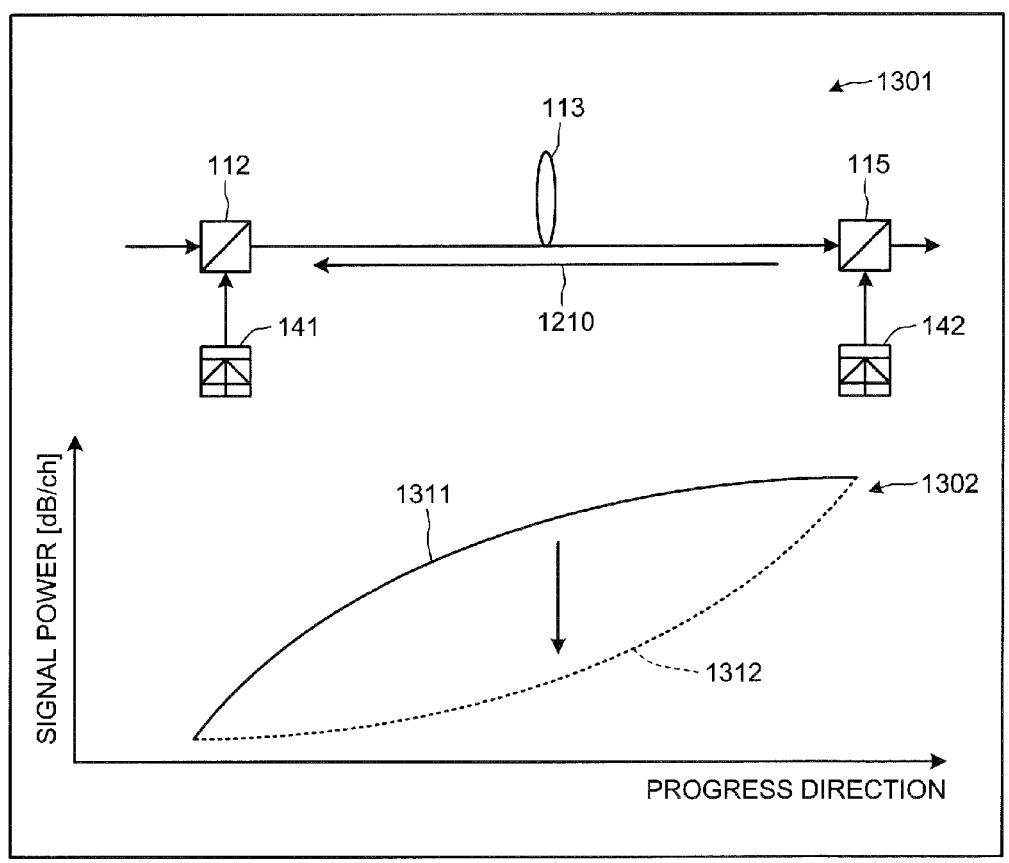
FIG. 13 is a schematic depicting changes in signal power in response to the control of the excitation ratio.

FIG. 13 is a schematic depicting changes in signal power in response to the control of the excitation ratio. In FIG. 13, a portion of the optical amplifier 100 depicted in FIG. 12 is depicted and indicated by reference numeral 1301. Reference numeral 1302 represents a graph depicting changes in the signal power [dB/ch] of the signal light passing through the optical amplifier 100. In the graph 1302, the horizontal axis indicates the progress direction corresponding to the portion of the optical amplifier 100 depicted and indicated by reference numeral 1301.

Reference numeral 1311 indicates a change in the power of the signal light passing through the optical amplifier 100 when the wavelength count of the signal light is large (e.g., 40 wavelengths). Reference numeral 1312 indicates a change in the power of the signal light passing through the optical amplifier 100 when the wavelength count is smaller than in the case of the power change 1311 (e.g., 10 wavelengths).

As described, the excitation power control unit 135 lowers the rate (excitation ratio) of the excitation light power of the first LD 141 relative to the excitation light power of the second LD 142 when the wavelength count of the signal light decreases. For example, when the wavelength count of the signal light changes from 40 wavelengths to 10 wavelengths, the power change 1311 changes to the power change 1312.

In the case of the power change 1312, the power of the signal light passing through the EDF 113 is lower than the case of the power change 1311. On the other hand, PHB has a property in that the occurrence PHB becomes more pronounced when the power of the signal light passing through the EDF is greater. Therefore, in the case of the power change 1312, the occurrence of PHB may be constrained as compared to the case of the power change 1311.

The excitation power control unit 135 lowers the excitation ratio when the wavelength count of the signal light is small and increases the excitation ratio when the wavelength count of the signal light is large as is in with the example of the first embodiment. Therefore, the increase in PHB is constrained when the wavelength count of the signal light is small while the increase in NF is constrained when the wavelength count of the signal light is large.

The operation of the optical amplifier 100 in the third embodiment is identical to that of the first embodiment (see FIG. 2) and will not be described. The change in the signal power due to the control of the excitation ratio in the third embodiment is identical to that in the first embodiment (see FIGS. 3 and 4) and will not be described. The method of determining the correlation information in the third embodiment is identical to that in the first embodiment (see FIGS. 5 to 8) and will not be described.

Figure 14:
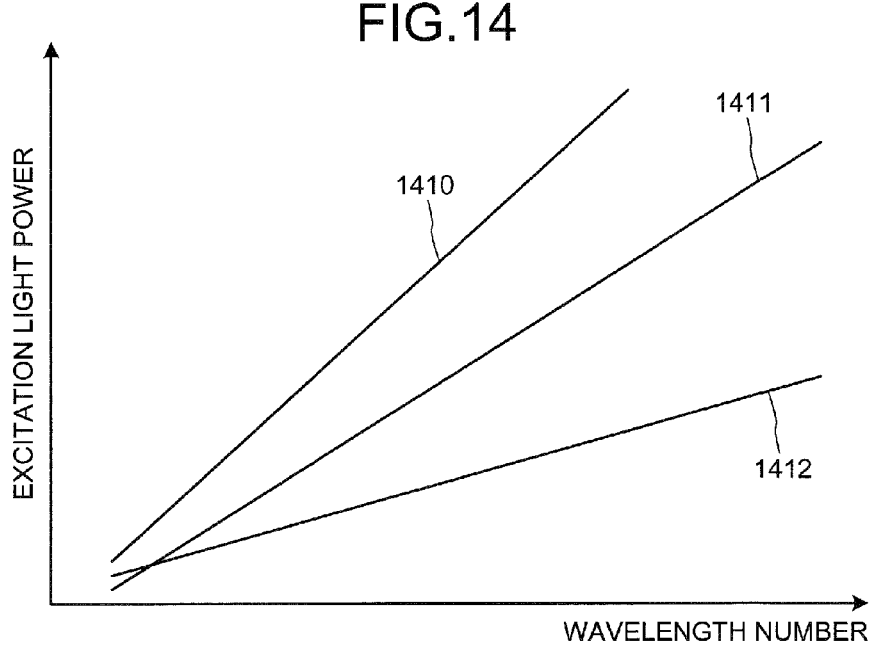
FIG. 14 is a graph of a relation between the wavelength count and the excitation light powers.

FIG. 14 is a graph of a relation between the wavelength count and the excitation light powers. In FIG. 14, the horizontal axis indicates the wavelength count of the signal light input to the optical amplifier 100. The vertical axis indicates the power of the excitation lights output from the first LD 141 and the second LD 142. Reference numeral 1410 indicates a relation between the wavelength count of the signal light and a total power of the excitation light of the first LD 141 and the second LD 142 controlled by the excitation power control unit 135.

Reference numeral 1411 indicates a relation between the wavelength count of the signal light and the power of the excitation light of the first LD 141 controlled by the excitation power control unit 135. Reference numeral 1412 indicates a relation between the wavelength count of the signal light and the power of the excitation light of the second LD 142 controlled by the excitation power control unit 135. Reference numeral 1410 indicates a sum of the relation represented by reference numeral 1411 and the relation represented by reference numeral 1412.

As indicated by the relation represented by reference numeral 1410, when the wavelength count of the signal light decreases, the excitation power control unit 135 performs control to keep the gain constant by reducing the total power of the excitation light of the first LD 141 and the second LD 142. On the other hand, as indicated by the relation represented by reference numerals 1411 and 1412, when the wavelength count of the signal light decreases, the excitation power control unit 135 performs control to increase the excitation ration between the first LD 141 and the second LD 142 to prevent signal deterioration resulting from PHB.

According to the optical amplifier 100 of the third embodiment, PHB is reduced in the case of a small wavelength count by acquiring the wavelength count of the signal light to change a rate between the power of the first excitation light and the power of the second excitation light according to the wavelength count of the signal light. Thus, the quality of the signal light is improved in a configuration with the EDF 113 excited from the upstream side by the first excitation light and excited from the downstream side by the second excitation light. Since a configuration omitting the EDF 116 (see FIG. 1) is possible, a lower cost of the apparatus is achieved.

Although the wavelengths of the excitation lights output by the first LD 141 and the second LD 142 are not particularly limited in the first to third embodiments, the PHB constraining effect varies according to the wavelengths of the excitation lights output by the first LD 141 and the second LD 142. Typical wavelengths of the excitation lights used in EDFA are 0.98 [μm] and 1.48 [μm].

Figure 15:
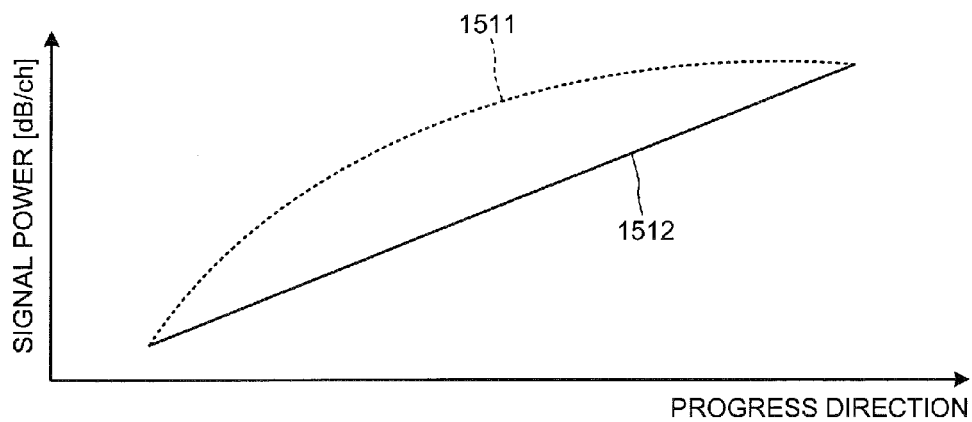
FIG. 15 is a graph of changes in signal power at wavelengths of each LD.

FIG. 15 is a graph of changes in signal power at wavelengths of each LD. Although changes in signal power in the EDF 113 and the first LD 141 will be described, the same applies to changes in signal power in the EDF 116 and the second LD 142. In FIG. 15, the horizontal axis indicates the progress direction of the signal light passing through the EDF 113.

Reference numeral 1511 indicates a change in the power of the signal light passing through the optical amplifier 100 when the wavelength of the excitation light output by the first LD 141 is 0.98 [μm]. Reference numeral 1512 indicates a change in the power of the signal light passing through the optical amplifier 100 when the wavelength of the excitation light output by the first LD 141 is 1.48 [μm].

As depicted in FIG. 15, if the wavelength of the excitation light is 1.48 [μm] (the power change 1512), the power of the signal light passing through the EDF 113 is lower than that when the wavelength of the excitation light is 0.98 [μm] (the power change 1511). On the other hand, PHB has a property in that the occurrence of PHB becomes more pronounced when the power of the signal light passing through the EDF is greater. Therefore, in the case of the power change 1512, the occurrence of PHB is constrained as compared to the case of the power change 1511.

Hence, in the first embodiment and the third embodiment, the occurrence of PHB is more effectively constrained by setting a wavelength of at least one of the excitation lights of the first LD 141 and the second LD 142 to 1.48 [μm]. In the second embodiment, the occurrence of PHB is effectively constrained by setting the wavelength of the excitation light of the first LD 141 to 1.48 [μm].

Figure 16:
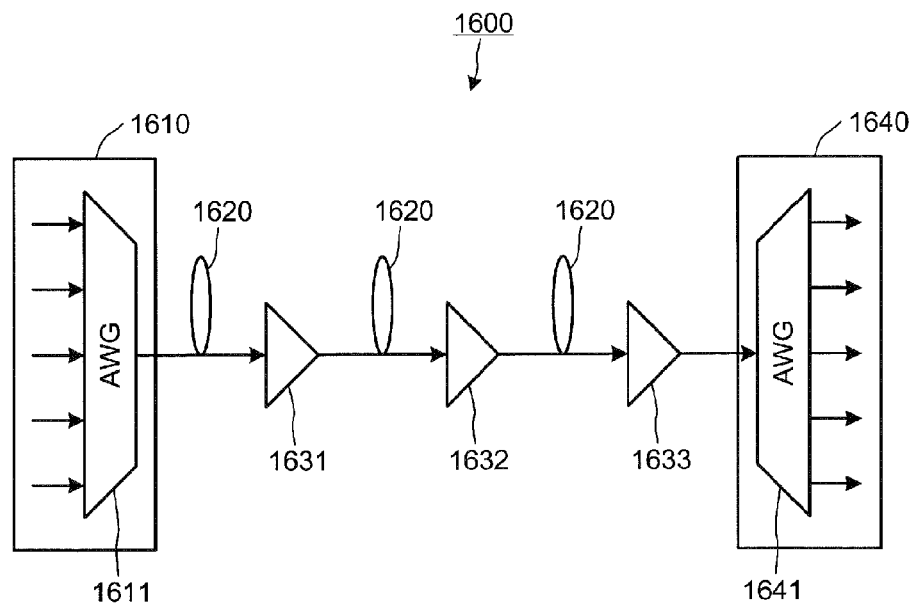
FIG. 16 is a block diagram of a communication system (part one) to which the optical amplifier is applied.

FIG. 16 is a block diagram of a communication system (part one) to which the optical amplifier is applied. As depicted in FIG. 16, a communication system 1600 includes a transmitting apparatus 1610, transmission paths 1620, EDFAs 1631 to 1633, and a receiving apparatus 1640. The transmitting apparatus 1610 includes an AWG 1611 that performs the wavelength multiplexing of signal lights each having different wavelengths.

The signal light wavelength-multiplexed by the AWG 1611 is transmitted through the transmission paths 1620 to the receiving apparatus 1640. The transmission paths 1620 are optical fibers that transmit the signal light transmitted from the transmitting apparatus 1610 to the receiving apparatus 1640. The EDFAs 1631 to 1633 are provided in the middle of the respective transmission paths 1620.

The EDFAs 1631 to 1633 amplify the signal light passing through the transmission paths 1620. Each of the optical amplifiers 100 according to the first to third embodiments is applicable to at least one of the EDFAs 1631 to 1633, for example. The receiving apparatus 1640 includes an AWG 1641 that performs the wavelength demultiplexing of the signal light received through the transmission paths 1620 from the transmitting apparatus 1610.

Figure 17:
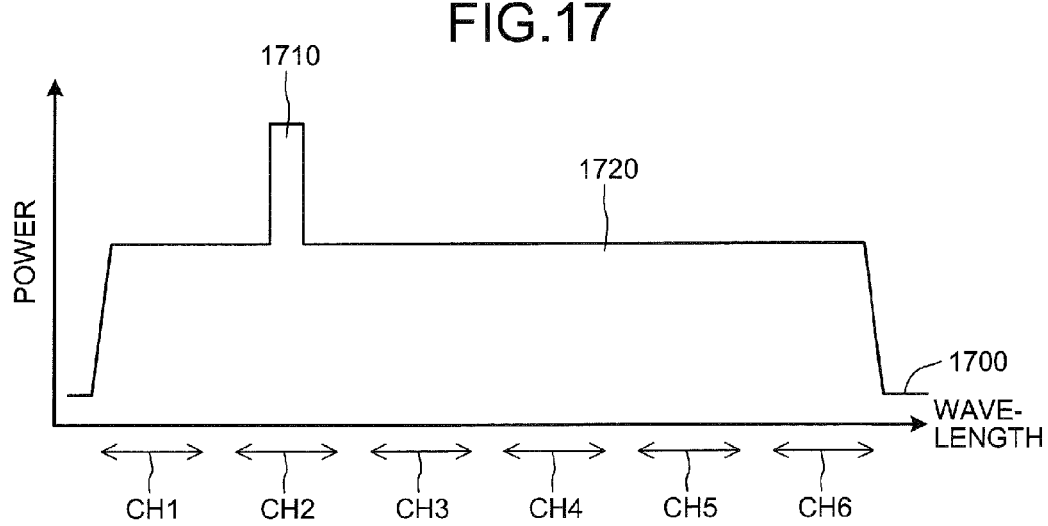
FIG. 17 is a graph depicting wavelength characteristics of signal light received by an EDFA depicted in FIG. 16.

FIG. 17 is a graph depicting wavelength characteristics of the signal light received by the EDFA depicted in FIG. 16. An example of applying the optical amplifier 100 depicted in FIG. 1 to the EDFA 1631 depicted in FIG. 16 will be described. In FIG. 17, the horizontal axis indicates the wavelength and CH1 to CH6 on the horizontal axis indicate the respective wavelength channels included in the signal light. The vertical axis indicates the power of the optical component. A wavelength characteristic 1700 indicates the wavelength characteristic of the signal light received by the EDFA 1631.

As indicated by the wavelength characteristic 1700, the signal light received by the EDFA 1631 includes a signal component 1710 and ASE 1720. Since CH2 includes the signal component 1710 and no signal component is included in CH1 and CH3 to CH6 in this example, the signal component 1710 in CH2 has a great effect on the degree of polarization of the signal light.

Thus, the polarization degree is increased in the signal light received by the EDFA 1631. In this case, considerable PHB tends to occur when the signal light passes through the EDFs of the EDFA 1631. On the other hand, the optical amplifier 100 applied to the EDFA 1631 is able to constrain the occurrence of PHB when the wavelength count of the signal light is small.

This enables the improvement of the quality of the signal light passing through the EDFA 1631. Therefore, the quality of the signal light received by the receiving apparatus 1640 is improved. If the optical amplifier 100 is applied to the EDFA 1632 and the EDFA 1633 depicted in FIG. 16, the quality of the signal light received by the receiving apparatus 1640 is further improved.

Figure 18:
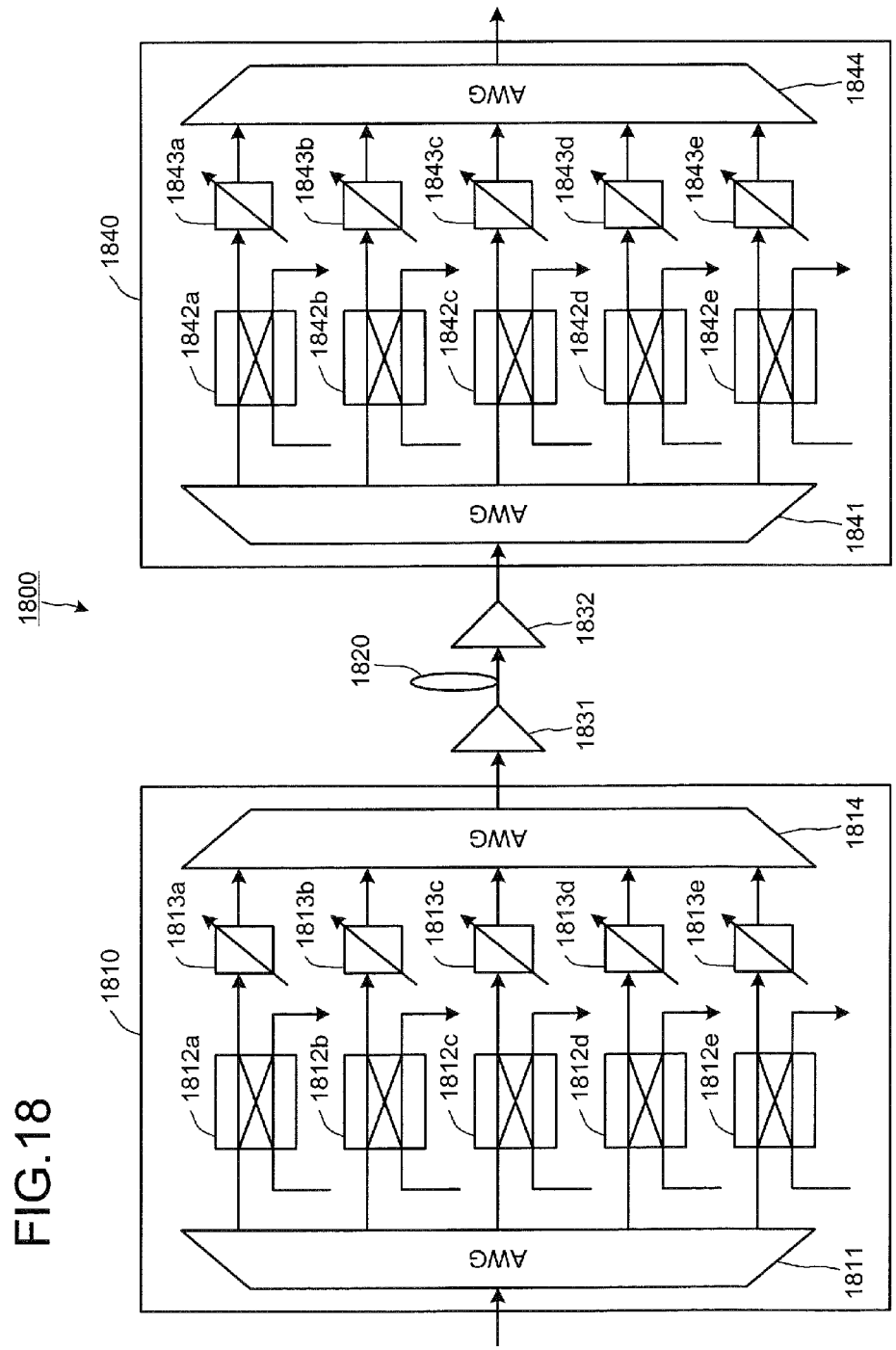
FIG. 18 is a block diagram of a communication system (part two) to which the optical amplifier is applied.

FIG. 18 is a block diagram of a communication system (part two) to which the optical amplifier is applied. As depicted in FIG. 18, a communication system 1800 includes an OADM 1810, transmission paths 1820, EDFAs 1831, 1832, and an OADM 1840. The OADM 1810 includes an AWG 1811, optical switches 1812a to 1812e, VOAs 1813a to 1813e, and an AWG 1814.

The AWG 1811 performs the wavelength demultiplexing of the signal light received from a communication apparatus upstream from the OADM 1810. The AWG 1811 outputs the wavelength-demultiplexed signal lights to the optical switches 1812a to 1812e. The respective optical switches 1812a to 1812e drop or transmit the signal lights output from the AWG 1811 or add signal lights.

The optical switches 1812a to 1812e respectively output the transmitted or added signal lights to the VOAs 1813a to 1813e. The respective VOAs 1813a to 1813e attenuate the signal lights output from the optical switches 1812a to 1812e by a variable attenuation amount. Each of the VOAs 1813a to 1813e increases the attenuation amount to constrain ASE if no signal component is included in the input signal light.

Each of the VOAs 1813a to 1813e outputs the attenuated signal light to the AWG 1814. The AWG 1814 performs wavelength multiplexing of the signal lights output from the VOAs 1813a to 1813e. The signal light wavelength-multiplexed by the AWG 1814 is transmitted to the OADM 1840 through the transmission paths 1820. The transmission paths 1820 are optical fibers that transmit the signal light transmitted from the OADM 1810 to the OADM 1840.

The EDFA 1831 and the EDFA 1832 are provided in the middle of the respective transmission paths 1820. The EDFA 1831 and the EDFA 1832 amplify the signal light passing through the transmission paths 1820. The OADM 1840 includes an AWG 1841, optical switches 1842a to 1842e, VOAs 1843a to 1843e, and an AWG 1844.

The AWG 1841, the optical switches 1842a to 1842e, the VOAs 1843a to 1843e, and the AWG 1844 are identical to the constituent elements of the OADM 1810 and will not be described. Each of the optical amplifiers 100 according to the first to third embodiments is applicable to at least one of the EDFA 1831 and the EDFA 1832, for example.

Figure 19:
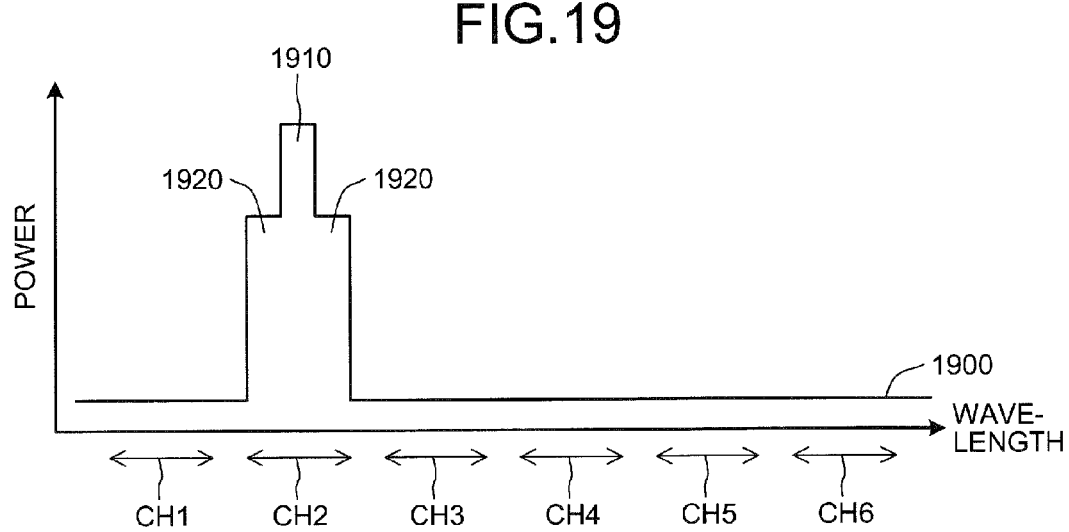
FIG. 19 is a graph depicting wavelength characteristics of the signal light received by the EDFA depicted in FIG. 18.

FIG. 19 is a graph depicting wavelength characteristics of the signal light received by the EDFA depicted in FIG. 18. An example of applying the optical amplifier 100 depicted in FIG. 1 to the EDFA 1831 depicted in FIG. 18 will be described. In FIG. 19, the horizontal axis indicates the wavelength and CH1 to CH6 on the horizontal axis indicate the respective wavelength channels included in the signal light. The vertical axis indicates the power of the optical component.

A wavelength characteristic 1900 indicates the wavelength characteristic of the signal light received by the EDFA 1831. As indicated by the wavelength characteristic 1900, the signal light received by the EDFA 1831 includes a signal component 1910 and ASE 1920. In this case, CH2 includes the signal component 1910 and no signal component is included in CH1 and CH3 to CH6.

Therefore, the signal component 1910 in CH2 has a great effect on the degree of polarization of the signal light received by the EDFA 1831. Thus, the polarization degree is increased in the signal light received by the EDFA 1831. In this case, considerable PHB tends to occur when the signal light passes through the EDFs of the EDFA 1831.

The signal light received by the EDFA 1831 has ASE constrained by the VOAs 1813a to 1813e of the OADM 1810. Hence, the signal component 1910 in CH2 has a greater effect on the degree of polarization of the signal light and the degree of polarization of the signal light is further increased. In this case, considerable PHB tends to further occur when the signal light passes through the EDFs of the EDFA 1831.

On the other hand, the optical amplifier 100 applied to the EDFA 1831 constrains the occurrence of PHB when the wavelength count of the signal light is small. This enables the improvement of the quality of the signal light passing through the EDFA 1831. Therefore, the quality of the signal light received by the OADM 1840 is improved.

If the optical amplifier 100 is applied to the EDFA 1832 depicted in FIG. 18, the quality of the signal light received by the OADM 1840 is improved further. As described, the optical amplifier 100 is especially effective when amplifying signal light for which ASE of unused channels is controlled.

According to the optical amplifier, PHB is reduced in the case of a small wavelength count by acquiring the wavelength count of the signal light to change the ratio between the power of the first excitation light and the power of the second excitation light according to the wavelength count of the signal light as described herein. Therefore, the quality of the signal light is improved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical amplifier comprising:
   a first excitation light source that outputs a first excitation light;
   a second excitation light source that outputs a second excitation light;
   a first amplifying optical fiber doped with a rare-earth element and excited by the first excitation light to amplify light input to the first amplifying optical fiber; and a second amplifying optical fiber doped with a rare-earth element and excited by the second excitation light to amplify the light from the first amplifying optical fiber, wherein a ratio between the intensity of the first excitation light and the intensity of the second excitation light is controlled according to a relation between the number of signal lights wavelength-multiplexed in the light input and polarization hole burning and a relation between the number of signal lights wavelength-multiplexed in the light input and noise figure.

2. The optical amplifier according to claim 1, wherein the intensity of the first excitation light relative to the intensity of the second excitation light increases as the number of signal lights increases.

3. The optical amplifier according to claim 1, wherein at least one among the first excitation light and the second excitation light has a wavelength of 1.48 μm.

4. An optical amplifier comprising:
a first excitation light source that outputs a first excitation light;
a second excitation light source that outputs a second excitation light; and
an amplifying optical fiber doped with a rare-earth element and excited from an upstream side by the first excitation light and excited from a downstream side by the second excitation light to amplify light input thereto, wherein
a ratio between the intensity of the first excitation light and the intensity of the second excitation light is controlled according to a relation between the number of signal lights wavelength-multiplexed in the light input and polarization hole burning and a relation between the number of signal lights wavelength-multiplexed in the light input and noise figure.

5. The optical amplifier according to claim 4, wherein the intensity of the first excitation light with respect to the intensity of the second excitation light increases as the number of signal lights increases.

6. The optical amplifier according to claim 4, wherein at least one among the first excitation light and the second excitation light has a wavelength of 1.48 μm.

7. An optical amplifier comprising:
an excitation light source that outputs excitation light;
a branching unit that branches the excitation light output from the excitation light source according to a variable branching ratio;
a first amplifying optical fiber doped with a rare-earth element and excited by a first excitation light branched from the excitation light by the branching unit to amplify light input to the first amplifying optical fiber; and
a second amplifying optical fiber doped with a rare-earth element and excited by a second excitation light branched from the excitation light by the branching unit to amplify the light output from the first amplifying optical fiber, wherein
the branching ratio of the branching unit is controlled according to a relation between the number of signal lights wavelength-multiplexed in the light input and polarization hole burning and a relation between the number of signal lights wavelength-multiplexed in the light input and noise figure.

8. The optical amplifier according to claim 7, wherein the intensity of the first excitation light with respect to the intensity of the second excitation light increases as the number of signal lights increases.

9. The optical amplifier according to claim 7, wherein the excitation light output from the excitation light source has a wavelength of 1.48 μm.

* * * * *